United States Patent [19]
Maki et al.

[11] Patent Number: 4,556,048
[45] Date of Patent: Dec. 3, 1985

[54] SOLAR HEAT COLLECTOR

[75] Inventors: Masao Maki, Nabari; Yasunori Kaneko, Nara; Hiroshi Fukuda, Yamatokoriyama, all of Japan

[73] Assignee: Matsushita Electric Industrial Co., Ltd., Osaka, Japan

[21] Appl. No.: 606,773

[22] PCT Filed: Aug. 16, 1983

[86] PCT No.: PCT/JP83/00268
§ 371 Date: Apr. 13, 1984
§ 102(e) Date: Apr. 13, 1984

[87] PCT Pub. No.: WO84/00804
PCT Pub. Date: Mar. 1, 1984

[30] Foreign Application Priority Data
Aug. 18, 1982 [JP] Japan ............... 57-143923
Dec. 1, 1982 [JP] Japan ............... 57-211560

[51] Int. Cl.⁴ .................... F24J 3/02
[52] U.S. Cl. .................... 126/417; 126/901; 428/414; 428/416; 428/913; 428/411.1
[58] Field of Search ........ 428/913, 423, 414, 416; 126/417, 436, 442, 443, 444, 445, 446, 447, 448, 449

[56] References Cited

U.S. PATENT DOCUMENTS

| 2,979,418 | 4/1961 | Didner | 428/414 X |
| 4,206,248 | 6/1980 | Schmidlin | 428/416 X |
| 4,230,768 | 10/1980 | Hamada et al. | 428/414 X |

FOREIGN PATENT DOCUMENTS 57-182435 11/1982 Japan ............... 428/414

Primary Examiner—Thurman K. Page
Attorney, Agent, or Firm—Spencer & Frank

[57] ABSTRACT

A solar heat collector comprising a polyolefin resin heat collecting base, produced by blow molding, to which first and second coating layers have been applied to overcome the high infrared radiation and poor adhesive characteristics of polyolefins. The first coating layer, principally composed of at least one resin selected from thermoplastic acrylic resins and alkyd resins, and chlorinated polyolefin resins, epoxy resins and metallic powders, is applied onto the polyolefin resin base and the second coating layer, having solar selective absorptivity, is applied onto the first coating layer; thereby providing an inexpensive solar collector that is both durable and reliable despite exposure to harsh environments.

11 Claims, 6 Drawing Figures

List of reference characters used in the drawings:

1 ............... Light transmitting body

2 ............... Heat collecting panel

3 ............... Thermal insulator

4 ............... Substrate

5 ............... Binder

6 ............... Metallic powder

7 ............... Oxide or compound oxide

8 ............... Resin

I ............... Layer I

II .............. First coating layer

III ............. Second coating layer

4,556,048

SOLAR HEAT COLLECTOR

This invention relates to a solar heat collector that can be utilized for domestic hot water supply and other purposes, which more particularly relates to a solar heat collector comprising heat collecting panels, principally composed of a polyolefin resin, the surfaces of which have been subjected to a selective absorption treatment.

BACKGROUND OF THE INVENTION

Desirable properties for a heat collecting surface, where solar energy is collected as heat, include solar selective absorptivity, that is, a radiation spectrum specificity of the heat collecting surface which allows the maximum absorption of solar energy in the ultraviolet, visible and near infrared regions while minimizing the radiation loss from the surface in the infrared region which dominates the radiation spectrum.

Various techniques such as, for example, plating and coating have been known for applying a solar selective absorption treatment on a metallic heat collecting panel.

A plastic heat collecting panel, on the other hand, has been produced by blow molding a polyolefin resin, such as high-density polyethylene filled with carbon black or like material. However, it was difficult to apply a solar selective absorbing treatment on such plastic heat collecting panel.

There may be cited the following two reasons for which it has been difficult to achieve said solar selective absorption treatment on a polyolefin resin heat collecting panel.

The first reason is that the formation of a coating on polyolefin resin is extremely difficult because of the non-adhesiveness of such resin.

The second reason is that the conventional selective absorption treatments, which have been applied to metallic heat collecting panels all make use of the fact that the metallic heat collecting panels have a low thermal emittance. However, the techniques used for such metallic panels can not be applied to resin heat collecting panels because such resin panels have a high thermal emittance.

SUMMARY OF THE INVENTION

The first object of the present invention, therefore, is to apply a solar selective absorption treatment onto the surface of a polyolefin resin heat collecting panel, which is light in weight and excellent in corrosion resistance in comparison with metal panels and to thereby improve the efficiency of the solar heat collector.

The second object of the present invention is to practice such solar selective absorption treatment using a coating system with excellent productivity to provide a solar heat collector with excellent performance at low cost.

The third object of the present invention is to apply long term protection to the resin surface, which is susceptible to deterioration by ultraviolet rays under the harsh environment in which the solar heat collector is used, to provide a solar heat collector with excellent durability.

In order to accomplish these objects, according to the present invention a first coating principally composed of a thermoplastic acrylic resin or an alkyd resin, a chlorinated polyolefin resin, an epoxy resin and a metallic powder is formed on a polyolefin resin base, and further a second coating layer having a solar selective absorptivity is formed on said first coating layer. The second coating layer is principally composed of at least one oxide or compound oxide of a metal or metals selected from the group consisting of Fe, Mn, Cu, Cr, Co and Ni and at least one resin selected from the group consisting of acrylic resin, fluorine resin, urethane resin and alkyd resin and has a thickness of 5 μm or less.

According to this structure, the first coating layer provides the effect of inhibiting radiation of infrared rays and the second coating layer provides solar selective absorptivity to the heat collecting surface, as this second coating layer is relatively pervious to infrared rays and is very effective in absorbing the sunlight.

Since said coatings are applied by painting with a coating mixture, mass production is possible at low cost.

Also, the adhesion between the base and the coating is splendid, as a surface unevenness of 250 μm or less is provided on the base resin surface to increase the bonding surface area.

The deterioration of the base due to moisture, ultraviolet rays, and etc., is prevented as the coating layers protect the surface, and hence an excellent durability is provided.

DESCRIPTION OF THE PREFERRED EMBODIMENTS

Figure 1:
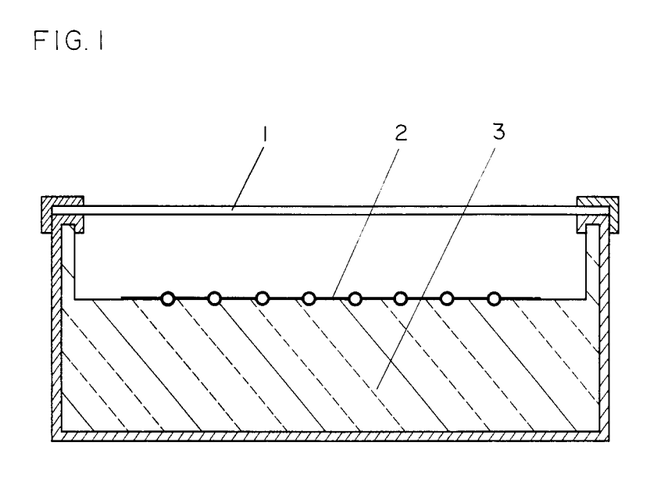
FIG. 1 is a sectional view of a solar heat collector in an embodiment of this invention.

FIG. 1 illustrates a solar heat collector generally used for the purpose of domestic hot water supply. This solar heat collector comprises a light transmitting body 1 such as a glass plate, a flat-plate-type collector panel 2 and a heat insulator 3. The heat collecting panel 2 is made of a polyolefin resin and is usually formed by blow molding.

The inside of this heat collecting panel 2 is so structured as to allow circulation of a heating medium such as water.

Figure 2:
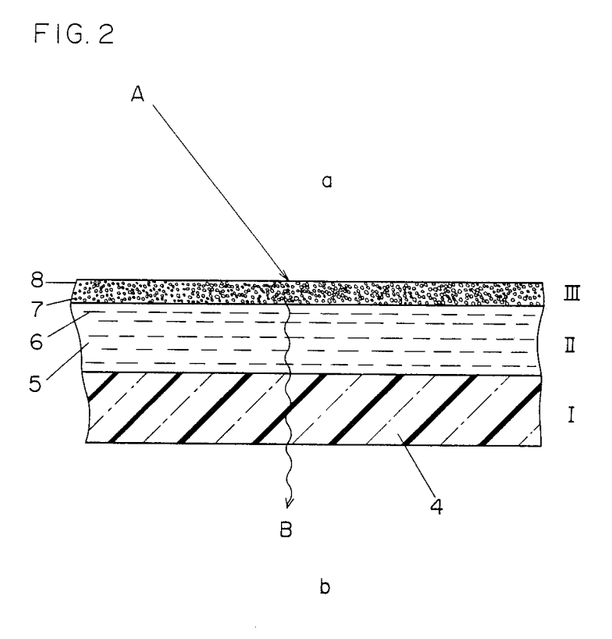
FIG. 2 is a sectional view of a heat collecting panel used in said solar heat collector.

FIG. 2 illustrates the heat collecting panel 2 of FIG. 1, which sectionally consists of the three layers I, II and III. Layer I is a substrate made of a polyolefin resin, and on this substrate 4 is formed a first coating layer II for inhibiting radiation of infrared rays, and further thereon is formed a second coating layer having a solar selective absorptivity. The a side of the structure is the side where the solar heat is received, and the b side is the medium side where the heat converted from the sun's rays is transmitted. Said first coating layer II is principally composed of a binder 5, such as a thermoplastic acrylic resin or alkyd resin, chlorinated polyethylene and epoxy resin, and a metallic powder 6. The metallic powder 6 can effectively reflect the infrared rays.

The second coating layer III is a layer having a solar selective absorptivity. It has a high light absorptivity in the sunlight wavelength region and is essentially transparent in the infrared wavelength region. Therefore, the sunlight A is absorbed in this second coating layer III and converted into heat, and this heat is transmitted through the first coating layer II and the layer I toward the heating medium side b as indicated by arrow B. On the other hand, since the second coating layer III is effectively transparent to infrared rays, the radiation loss from the surface is governed by the metallic powder 6 in the first coating layer II to keep a low emissivity. As a result, a sufficiently selective absorptivity is provided on the substrate 4.

The adhesion of the coating layer to the polyolefin resin forming the substrate 4, which has been extremely difficult to achieve in the prior art, has been accomplished in an embodiment of the present invention by the use of a chlorinated polyolefin resin.

A high-density polyethylene resin is most typically used as the polyolefin resin of the substrate 4. Accordingly, the following description of the present invention will be made regarding principally the case using a polyethylene resin. In the case of a polypropylene resin, it can be readily applied in the similar way by simply replacing polyethylene with polypropylene.

Regarding the adhesion with the polyethylene resin substrate 4, to which it is usually hard to adhere, the use of a chlorinated polyethylene, taking advantage of its solubility parameters is not novel. This type of technique has been commercialized in, for instance, preparation of ink. However, many of such polyethylenes are highly chlorinated, with the content of chlorine in relatively low molecular weight polymers (in the order of several thousands) being not less than 66%, produced by a solution method. These chlorinated polyethylenes, although having a good adhesion to low- to medium-density polyethylenes, demonstrate unsatisfactory adhesion to high-density polyethylenes. However, chlorinated polyethylenes produced by an aqueous suspension method can be obtained with a molecular weight from several tens of thousands to greater than one hundred thousand, the chlorine content being from 30 to 50%.

In the structure according to one embodiment of this invention, it is desirable to use a chlorinated polyethylene produced by the aqueous suspension method. The reasons are as follows:

(1) There is little likelihood of metallic powder 6 leafing being impaired because of a low chlorine content. That is, owing to small polarity and a low acid value, an effective metallic powder leafing can be realized.

(2) Excellent adhesion can be realized because of a large molecular weight and many structural similarities to high-density polyethylene.

These chlorinated polyethylenes have a certain limitation in their compatibility with other resins because of a large molecular weight and high solution viscosity, however, it is desirable to use them in combination with other resins for realizing their stabilized properties in a coating system. Mixing of an alkyd resin or acrylic resin with said chlorinated polyethylene gives an excellent resin base. Great difficulties are met when it is attempted to prepare a coating layer capable of effecting an excellent infrared reflection by dispersing metallic powder 6 in said resin base. Dispersion of metallic powder 6 to an excess degree is to be avoided to obtain good infrared reflection. However, is such dispersion is restriction to a range suited for improving leafing alone, the resulting coating film becomes unstable and tends to peel off at the metallic leafing layer.

On the other hand, if dispersion is made to a degree efficient to attain a good adherence, there arises the problem that achieving the desired leafing property becomes difficult. The addition of an epoxy resin proves very effective for overcoming this difficulty. This epoxy resin performs the function of letting the metallic powder 6 itself stably adhere in the coating while maintaining the good leafing property of the metallic powder 6. As the metallic powder 6, there can be used a powder of copper, aluminum or the like which has the leafing property, and it is especially desirable to use an aluminum powder of coarse particles. The blending ratio of such metallic powder 6 is preferably in the range of 5 to 40% by weight. The range of 10 to 25% by weight gives optimal leafing and adherence.

The formation of such first coating layer II can provide a surface of low emissivity, similar to that of metal, so that it becomes possible to apply on this first coating layer II a layer of any of various coating systems having selective sunlight absorptivity that have been applied onto metal bases in the prior art.

However, in view of the adherence of the first coating layer II and the restriction relating to the hardening conditions for the application on a plastic layer, as well as the conditions relating to selective absorptivity, it is desirable that the second coating layer III is a layer which is principally composed of at least one oxide or compound oxide of a metal or metals selected from the group consisting of Fe, Mn, Cu, Cr, Ni and Co and at least one resin 8 selected from the group consisting of acrylic resin, fluorine resin, urethane resin and alkyd resin and which has a thickness not greater than 5 $\mu$m.

Said metal oxide pigments have almost no ability to absorb infrared rays but have an excellent solar absorptivity. It is desirable that these metal oxides, for use in this invention, are of a particle size within the range of 0.01 to 0.5 $\mu$m. For it is considered that when the particle size is in said range, the effect of favorably scattering or absorbing the sunlight is most prominent.

Acrylic resin, fluorine resin, urethane resin and alkyd resin can realize a good adhesion to the first coating layer II. Also, since the coating thickness is regulated to 5 $\mu$m at largest, this second coating layer shows a relatively good perviousness to infrared rays.

Hereinafter, the effect of the invention will be explained by further describing the invention in regard to its typical embodiments. The evaluation of solar selective absorptivity was made in the following way.

The evaluation of absorptivity $\alpha$ was made by calculating it in terms of emissivity at atmospheric radiation AM=2 form the measured values at wavelengths 0.3–2.0 $\mu$m by using a self-recording spectrophotomer Model MPS-5000 by SHIMAZU SEISAKUSHO (angle of incidence: 8° equipped with an integrating sphere reflector). The emissivity $\epsilon$ was directly evaluated by using D and SAERD Emissivity Meter by DIVICES & SERVICES CO.

EXAMPLES

For forming the substrate 4, a high-density polyethylene containing 1.5% of carbon black was worked into the dimensions of 70 mm×150 mm×1 mm and this plate was used as test piece. The emissivity ε of this sample was 0.92.

The undercoating materials forming the first coating layer II were prepared by blending the measured amounts of the substances shown in Table 1 and dispersing and mixing them for one hour in a ball mill. Then each of these coating materials was applied to said test piece to a thickness of 10 to 20 μm and dried at 60° C. for about one hour. The adhesiveness of each of the thus prepared specimens was evaluated by a cellophane adhesive tape peel test, the results being shown in Table 2. From the results of Table 2, it can be learned that in a dispersed state of metallic powder 6, where leafing of said powder is controlled advantageously and any excess dispersion is avoided, the metallic powder 6 itself is extremely unstable unless an epoxy resin and a chlorinated polyethylene prepared by a suspension method coexist.

The topcoating materials used for forming the second coating layer III were prepared from the blends shown in Table 3. Each specimen was prepared from 24-hour dispersion and mixing by using a ball mill. Each of these coating materials was applied to a panel, which had been coated with the coating material P-12, to a dry coating film thickness of about 15 μm.

TABLE 1

Blends of undercoating materials (parts by weight)

| Type | *1 Metallic powder | *2 Chlorinated propylene modified acrylic resin | Epoxy resin *3 | *4 | Chlorinated polyethylene *5 | *6 | *7 Alkyd resin | *8 Acrylic resin | Solvent |
|------|--------|--------|------|----|------|----|------|------|---------|
| P-1  | 15  | 50 |    |    |    |    |    |    | 50 |
| P-2  | 15  | 50 | 15 |    |    |    |    |    | 50 |
| P-3  | 15  | 50 | 15 | 15 |    |    |    |    | 50 |
| P-4  | 15  | 50 | 15 |    |    | 15 |    |    | 50 |
| P-5  | 15  |    |    |    | 15 |    | 50 |    | 50 |
| P-6  | 15  |    |    |    | 15 |    | 50 |    | 50 |
| P-7  | 15  |    | 15 |    |    | 15 | 50 |    | 50 |
| P-8  | 15  |    | 15 | 15 |    |    |    | 50 | 50 |
| P-9  | 15  |    | 15 |    | 15 |    |    | 50 | 50 |
| P-10 | 2.5 |    | 15 |    | 15 |    |    | 50 | 50 |
| P-11 | 20  |    |    | 15 | 15 |    |    | 50 | 50 |
| P-12 | 20  |    |    | 15 | 15 |    | 50 |    | 50 |

*1: Alpaste 0100X by Toyo Aluminum K.K.
*2: Acrytic 56-834 by Dainippon Ink & Chemicals, Inc.
*3: Epikote 823 by Yoka Shell Epoxy Co., Ltd.

TABLE 2

Results of evaluation of undercoating

| Type | Evaluation of adhesiveness | Emissivity (ε) | Remarks |
|------|------|------|------|
| P-1  | x | — | No adhesiveness to the base. |
| P-2  | Δ | — | Aluminum peeled off in dots. |
| P-3  | Δ | — | Aluminum peeled off in dots. |
| P-4  | o | 0.50 | |
| P-5  | x | — | Poor adhesiveness. Film peeled off generally. |
| P-6  | Δ | — | Film peeled off like pinholes. |
| P-7  | o | 0.28 | |
| P-8  | Δ | — | Film peeled off like pinholes. |
| P-9  | o | 0.30 | |
| P-10 | o | 0.60 | |
| P-11 | o | 0.24 | |
| P-12 | o | 0.20 | |

TABLE 3

Blends of topcoating materials (parts by weight)

| | Pigment | | | Resin | | | | | | |
|Type| *1 | *2 | *3 | *4 | *5 | *6 | *7 | *8 | *9 | Solvent |
| T-1  |    |    | 5  | 50 |    |    |    |    |    | 150 |
| T-2  |    | 60 |    |    |    |    |    |    |    | 150 |
| T-3  | 25 |    |    | 50 |    |    |    |    |    | 150 |
| T-4  | 40 |    |    | 50 |    |    |    |    |    | 150 |
| T-5  | 60 |    |    | 50 |    |    |    |    |    | 150 |
| T-6  | 60 |    |    |    | 50 |    |    |    |    | 150 |
| T-7  | 60 |    |    |    |    | 50 |    |    |    | 150 |
| T-8  | 60 |    |    |    |    |    | 50 |    |    | 150 |
| T-9  | 60 |    |    |    |    |    |    | 50 |    | 150 |
| T-10 | 60 |    |    |    |    |    |    |    | 50 | 150 |

*1: Dibyroxide Color #9550 (Fe$_2$O$_3$.MnO$_2$.CuO) by Dainichiseika Color & chemicals Mfg. Co.
*2: Dibryoxide Color #9510 (CuO.Cr$_2$O$_3$) by Dainichiseika Color & Chemicals Mfg. Co.
*3: Color Black FE-200 (carbon black) by DEGUSSA (GFR)
*4: Dianal LR-143 (acrylic resin) by Mitsubishi Rayon Co., Ltd.
*5: Bekkosole J-557 (alkyd resin) by Dainippon Ink & Chemicals, Inc.
*6: Lumifron LF-100 (fluorine resin) by Asahi Glass Co., Ltd.
*7: SHINETSU SILICONE KR-255 (silicone resin) by The Shin-Etsu Chemical Co., Ltd.
*8: DESMOPHEN 800 (urethane resin) by Sumitomo-Bayern Co., Ltd.
*9: EPIKOTE 1001 (epoxy resin) by Yuka Shell Epoxy Co., Ltd.

TABLE 4

Results of performance evaluation tests of coating systems

| Type | Adhesiveness | Solar absorptivity (α) | Infrared emissivity (ε) |
|------|------|------|------|
| R-1  | o | 0.90 | 0.89 |
| R-2  | o | 0.92 | 0.60 |
| R-3  | o | 0.90 | 0.45 |
| R-4  | o | 0.91 | 0.43 |
| R-5  | o | 0.93 | 0.43 |
| R-6  | o | 0.93 | 0.47 |
| R-7  | o | 0.93 | 0.40 |
| R-8  | x | 0.93 | 0.45 |
| R-9  | o | 0.93 | 0.50 |
| R-10 | o | 0.93 | 0.72 |

Table 4 above shows the results of the performance evaluation tests conducted on the respective coating systems.

From the above results, it is seen that when comparing the metal oxide pigments and carbon black, the latter can not achieve the desired solar selective absorptivity even if its coating thickness is 1.5 μm. It is also noted that silicone resin is defective in its adhesiveness to the primer while epoxy resin is poor in perviousness to infrared rays. The best results is obtained when fluorine resin is used.

Although not mentioned above, in relation to achieving the desired coat, the coating may contain fillers, additives, surfactants and/or other substances for retaining the coating workability.

In the combination systems of said coating materials, the reliability of the coating film properties becomes highest in the case in which coating material P-12 is used for undercoating and coating material T-7 is used for topcoating.

In case of using the first and second coating layers II and III as in the present invention, in order to achieve an adherence with higher reliability, the improvement of reliability of adhesion between the substrate 4 and the undercoating, that is, the first coating layer II, becomes the matter of primary concern in consideration of various sorts of bonding strength.

As a means for improving reliability of adhesion between the two, we have tried to form fine inequalities in the surface of the substrate 4 in order to increase the area of adhesion.

The following test was conducted.

A plate made of a high-density polyethylene resin (containing 1.5% by weight of carbon black) and having the dimensions of 95 mm×190 mm×10 mm was used as test piece.

This plate was hollow in its interior and was formed by blow molding.

Both sides of the test piece were sectioned into four zones of 95 mm×95 mm, and molding was performed using a blow molding die which had been sandblasted with the particle sizes of 40, 60, 80 and 100 mesh, respectively, so that the fine irregularities or roughness would be formed respectively on the four zones on both sides of the test piece.

Evaluating the surface unevenness by a scanning electron microscope, it was found that the uneven faces were formed on the respective zones with an average 350 μm roughness by 40-mesh sandblasting, an average 250 μm roughness by 60-mesh sandblasting, an average 180 μm roughness by 80-mesh sandblasting and an average 150 μm roughness by 100-mesh sandblasting.

Coating materials the same as P-12 except for a difference in aluminum powder content were applied to said substrate 4 to a coating thickness of about 10 to 20 μm and dried at 60° C. for 30 minutes.

The amount of aluminum powder blended was changed to 10, 20, 30, 40 and 50 parts by weight to 100 parts by weight of the chlorinated polyethylene modified alkyd resin.

The adhesiveness of these coatings was evaluated by the cellophane adhesive tape peel test.

As the results showed, in the case of the 40-mesh sample, partial dotted peeling occurred when the aluminum content was above 20 parts by weight and general peeling took place when the aluminum content was over 40 parts by weight, while in the case of 60 mesh dotted peeling occurred when the aluminum content was greater than 40 parts by weight, and no abnormality such as peel was seen in the case of 80 and greater members. It was thus confirmed that when a coating material with an aluminum content below 30 parts by weight is used, a good adhesion can be obtained by forming irregularities of less than 250 μm on the surface.

Table 5 below shows the result of a reliability test of film properties of a coating system where the surface roughness of the substrate 4 was 180 μm, the coating material P-12 was used for the undercoating constituting the first coating layer II, and T-7 was used for the topcoating forming the second coating layer III.

As the results show, the coating on the polyolefin resin base could easily withstand the harsh test conditions as a solar heat collector, and high adhesion reliability was obtained.

The coating material T-7 was prepared by using a solvent type fluorine resin binder. The solvent type fluorine resin is a copolymer of ethylene tetrafluoride resin and a resin having a alcoholic hydroxyl group. Ethylene tetrafluoride resin is insoluble in solvents and hard to work into a coating material. However, its solubility was improved by the introduction of an alcoholic hydroxyl group, forming a binder very easy to treat. Hardening was accomplished through urethane bonding with the alcoholic hydroxyl group by using an isocyanate. The T-7 system coatings are hardened by using "Colonate EH" by Nippon Polyurethane Industry Co., Ltd.

This allows both the excellent properties such as good weathering resistance of fluorine resin and the ease of application as a coating material to stand together.

The results in Table 5 the many advantages of the use of this fluorine resin.

TABLE 5

| Test items | Coating film property reliability test results | |
|---|---|---|
| | Conditions | Results |
| Adhesiveness | 2 mm checkered taping | No abnormality |
| Impact resistance | 50 cm drop of 1-inch, 300-gram steel ball | " |
| Salt water resistance | 10-day immersion in a 5% NaCl solution | " |
| Heat resistance | 110° C., 500 H | " |
| Heat shock resistance | 300 cycles at 100° C. for 30 min. and at −20° C. min. | " |
| Accelerated weathering test | Weathermeter, 2,000 H | " |
| Cold resistance | −15° C., one month | " |

Hereinafter, the reasons for which the excellent adhesion reliability can be obtained by the present coating system will be considered from the viewpoints of binding force and adhesiveness.

Figure 3:
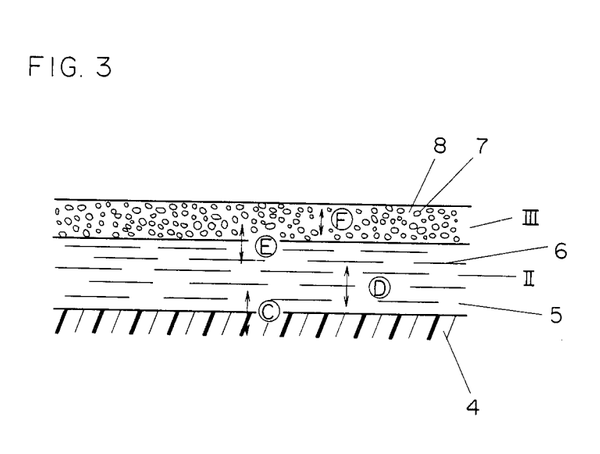
FIG. 3 is a sectional view emphatically illustrating the adhesive interface where the problem of adhesion tends to arise in relation to said heat collecting panel.

FIG. 3 shows the adhesive interface which involves the problem in the present coating system. Four types of adhesive area are to be considered.

Ⓒ Adhesion between substrate 4 and undercoating (second coating layer II) . . . . It is believed that polyolefin resin and chlorinated polyolefin are bonded by van der Waals forces.

Ⓓ Retention of binding of metallic powder 6 into first coating layer II . . . . It is believed that metallic powder is bound through hydrogen bonds with epoxy resin.

Ⓔ Adhesion between first coating layer II and second coating layer III . . . . It is belived that both layers are joined by covalent bonding through urethane bonding of epoxy resin (first coating layer) and reactive isocyanate (second coating layer).

Ⓕ Retention of binding of metal oxide pigment into second coating layer III . . . . It is believed that binding is effected through hydrogen bonding by solvent type fluorine resin (having a reactive hydroxyl group in the molecule).

It is believed that the achievement of the excellent adhesiveness of the present coating system is a result of the above described mechanisms.

Figure 4:
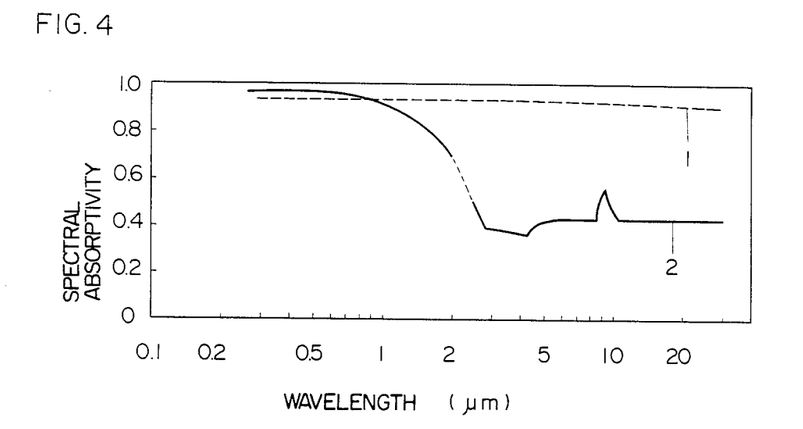
FIG. 4 is a characteristic diagram comparatively showing the spectral reflection characteristics of the heat collecting surface in a product according to the present invention and in a conventional product.

FIG. 4 shows the result of evaluation of spectral absorptivity of a heat collecting panel 2 in an embodiment of the present invention. In FIG. 4, 1 represents the test result of a conventional black-colored plastic heat collecting panel, and 2 represents the test result of the heat collecting panel according to an embodiment of the present invention. It will be seen that an solar selective absorptivity can be obtained at a wavelength region of 2 to 3 μm.

Figure 5:
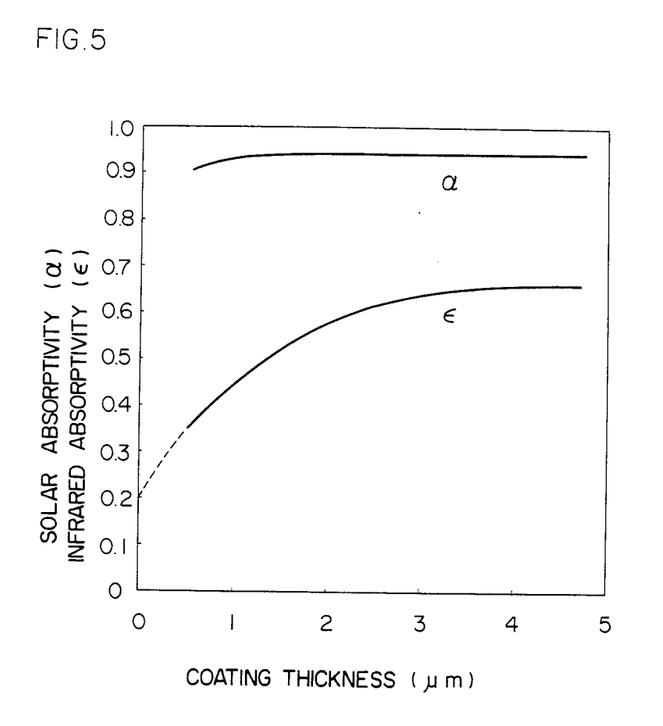
FIG. 5 is a characteristic diagram showing the relation between the thickness of the second coating layer of said heat collecting panel and the solar absorptivity (α) and the infrared emissivity (ε).

FIG. 5 shows the results of evaluation of the relation between coating thickness and solar absorptivity (α) and infrared emissivity (ε) when the thickness of the topcoating (second coating layer III) was changed in the same coating system.

It is seen that an excellent selective absorption can be obtained especially when the topcoating thickness is in the range of 1 to 1.5 μm.

Figure 6:
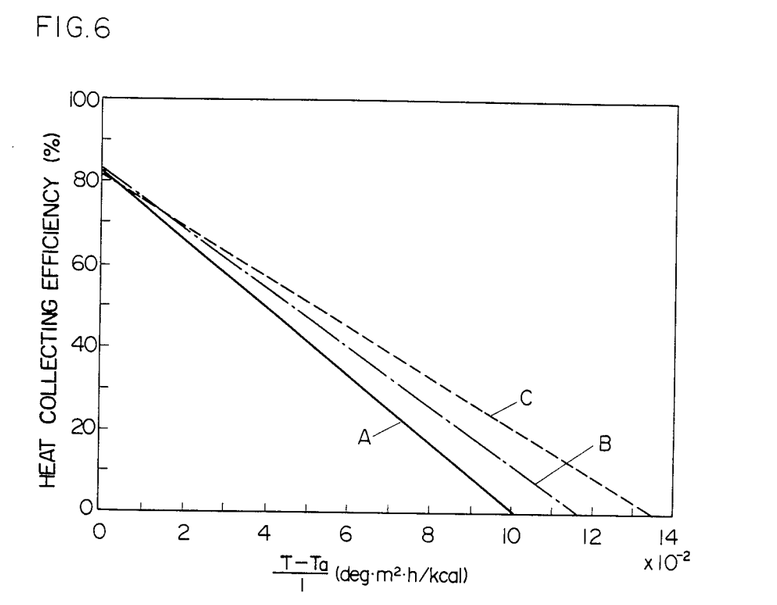
FIG. 6 is a characteristic diagram showing a comparison in performance between a solar heat collector to which the present invention has been applied and a conventional product.

FIG. 6 show a comparative evaluation of the heat collecting performance of a flat plate-type solar heat collector according to an embodiment of the present invention and those of the prior art.

In FIG. 6, A represents the case using a conventional black-colored plastic heat collecting panel, B represents the case using the heat collecting panel according to an embodiment of the present invention, and C represents the case using a heat collecting panel obtained by applying a conventional selective absorption treatment (colored stainless coating) on a metal plate.

In case of using the heat collecting panel according to the present invention, about 5% improvement of heat collecting efficiency can be expected in comparison with the conventional black-colored plastic panel. Conversely, when compared with the colored stainless coated metal plate, the heat collecting panel of the present invention is about 5% inferior (in heat collecting efficiency), but the latter is more advantageously economically since more than 20% cost reduction can be expected.

According to the present invention, as explained in the above-described embodiments, in order to attain a low emissivity in the infrared radiation region on the heat collecting face of said heat collecting panel there is formed a first coating layer principally composed of at least one of thermoplastic acrylic resin or alkyd resin and chlorinated polyolefin resin and epoxy resin and a metallic powder, and on this first layer is further formed a second coating layer having a solar selective absorptivity.

With this structure, there is obtained a solar heat collector that can withstand the harsh use environment for such solar heat collectors and, thus, provides excellent reliability and advantageous cost performance.

What is claimed is:

1. A solar heat collector comprising a heat collecting panel principally composed of a polyolefin resin base, a first coating layer formed on said polyolefin resin base, and a second coating layer having solar selective absorptivity formed on said first coating layer; wherein said first coating layer comprises one or more resins selected from thermoplastic acrylic resins and alkyd resins in combination with chlorinated polyolefin resins, epoxy resins and a metallic powder.

2. A solar heat collector according to claim 1, wherein the second coating layer comprises an oxide or a mixture of oxides of one or more metals selected from the group consisting of Fe, Mn, Cu, Cr, Ni and Co, mixed with at least one resin selected from the group consisting of acrylic resins, fluorine resins, urethane resins and alkyd resins, and has a thickness of 5 μm or less.

3. A solar heat collector according to claim 1, wherein the surface of the heat collecting panel polyolefin resin base is provided with a surface roughness of 250 μm depth or less.

4. A solar heat collector according to claim 2, wherein the second coating layer comprises a fluorine resin which is a copolymer of a fluorinated olefin and a polymer having an alcoholic hydroxyl group that is hardened with an isocyanate.

5. A solar heat collector according to claim 2, wherein the thickness of the second coating layer is 1 to 1.5 μm.

6. A solar heat collector according to claim 1, wherein the polyolefin resin base is a high-density polyethylene, and the chlorinated polyolefin in the first coating layer is produced by the aqueous suspension method.

7. A solar heat collector according to claim 1, wherein the metallic powder in the first coating layer is present in an amount of 5 to 40% by weight.

8. A solar heat collector according to claim 1, wherein the metallic powder in the first coating layer is present in an amount of 10 to 25% by weight.

9. A solar heat collector according to claim 2, wherein the metal oxides have a particle size of 0.01 to 0.5 m.

10. A solar heat collector according to claim 1, wherein the first coating layer comprises a thermoplastic acrylic resin, a chlorinated polyolefin resin, an epoxy resin and a metallic powder.

11. A solar heat collector according to claim 1, wherein the first coating layer comprises an alkyd resin, a chlorinated polyolefin resin, an epoxy resin and a metallic powder.

* * * * *